US012639361B2

(12) United States Patent
Jiang et al.

(10) Patent No.: US 12,639,361 B2
(45) Date of Patent: May 26, 2026

(54) ISSUE HANDLING USING UNSUPERVISED MACHINE LEARNING

(71) Applicant: Dell Products L.P., Round Rock, TX (US)

(72) Inventors: Alice Jiang, Waltham, MA (US); Tony Zhongxia Chen, Shanghai (CN); Wyatt Weiqi Mao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 18/497,721

(22) Filed: Oct. 30, 2023

(65) Prior Publication Data

US 2025/0139152 A1    May 1, 2025

(51) Int. Cl.
| | |
|---|---|
| *G06F 16/383* | (2019.01) |
| *G06F 16/35* | (2025.01) |
| *G06F 40/284* | (2020.01) |
| *G06F 40/40* | (2020.01) |

(52) U.S. Cl.
CPC ............ *G06F 16/383* (2019.01); *G06F 16/35* (2019.01); *G06F 40/284* (2020.01); *G06F 40/40* (2020.01)

(58) Field of Classification Search
CPC ...... G06F 16/383; G06F 16/35; G06F 40/284; G06F 40/40; G06F 40/30
See application file for complete search history.

(56) References Cited

U.S. PATENT DOCUMENTS

| | | | | |
|---|---|---|---|---|
| 10,263,924 | B1* | 4/2019 | Davidson | .............. H04L 51/046 |
| 2010/0161616 | A1* | 6/2010 | Mitchell | ................ G06F 16/31 |
| | | | | 707/741 |
| 2013/0282725 | A1* | 10/2013 | Rubinger | .............. G06F 16/173 |
| | | | | 707/E17.046 |
| 2020/0349464 | A1* | 11/2020 | Lin | ........................ G06N 3/084 |
| 2021/0255926 | A1* | 8/2021 | Wang | ....................... G06N 5/04 |
| 2022/0398267 | A1* | 12/2022 | Sims | ....................... G06F 40/12 |
| 2023/0080660 | A1* | 3/2023 | Miletic | ................ G10L 15/063 |
| | | | | 382/103 |

(Continued)

*Primary Examiner* — Darioush Agahi
(74) *Attorney, Agent, or Firm* — Krishnendu Gupta; Derek Lam

(57) ABSTRACT

Techniques are disclosed for issue handling. One example system includes at least one processing device including a processor coupled to a memory. The processing device is configured to implement the following: processing collected input text into sentence-structured data and non-sentence-structured data. For the non-sentence-structured data, determining a number 'k' of clusters for the non-sentence-structured data, and using a first ML algorithm to generate a non-sentence-structured issues list by categorizing the non-sentence-structured data into 'k' clusters. For the sentence-structured data, using a second ML model to generate a sentence-structured issues list based on semantic similarity determined among the sentence-structured data. For each issue in the non-sentence-structured and in the sentence-structured issues lists, identifying linked issues, using a support ticket system, among the non-sentence-structured and the sentence-structured issues lists, and using the linked issues to order each issue based on computing a weighted ranking score for each issue.

18 Claims, 3 Drawing Sheets

(56)          References Cited

U.S. PATENT DOCUMENTS

| | | | |
|---|---|---|---|
| 2023/0116804 A1* | 4/2023 | Bank ...................... | G06F 3/0482 |
| | | | 704/9 |
| 2023/0167476 A1* | 6/2023 | Tuller .................... | C12P 21/00 |
| | | | 435/69.1 |
| 2023/0169516 A1* | 6/2023 | Rapp ...................... | G06F 40/56 |
| | | | 704/9 |
| 2023/0385884 A1* | 11/2023 | Ravindran ............ | G06F 40/295 |
| 2024/0217389 A1* | 7/2024 | Negoita ................. | B60L 58/16 |
| 2024/0330672 A1* | 10/2024 | Bhavya ................. | G06N 5/022 |
| 2024/0370287 A1* | 11/2024 | Tiwari ................ | G06F 9/45558 |
| 2025/0045259 A1* | 2/2025 | Srinivasan ............ | G06F 16/219 |

* cited by examiner

200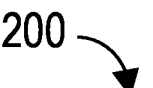

202 — Processing text into sentence-structured data and non-sentence-structured data 204 — For the non-sentence-structured data, determining a number 'k' of clusters and using a first ML algorithm to generate a non-sentence-structured issues list by categorizing the non-sentence-structured data into 'k' clusters 206 — For the sentence-structured data, using a second ML model to generate a sentence-structured issues list based on semantic similarity determined among the sentence-structured data 208 — For each issue in the non-sentence-structured issues list and in the sentence-structured issues list, identifying linked issues, using a support ticket system, among the non-sentence-structured issues list and the sentence-structured issues list 210 — Using the linked issues to order each issue based on computing a weighted ranking score for each issue

FIG. 2

ISSUE HANDLING USING UNSUPERVISED MACHINE LEARNING

FIELD

Example embodiments generally relate to identification and resolution of customer system problems. More specifically, at least some embodiments relate to systems, hardware, software, computer-readable media, and methods for identifying recommended solutions for a customer system problem by identifying related support tickets from customers using machine learning.

BACKGROUND

It is desirable for product support groups such as quality assurance teams to leverage evolving technologies to assist, speed-up, and potentially automate issue troubleshooting in order to shorten the Time-To-Resolve (TTR) and improve the user experience with a product. Some attempts involve leveraging machine learning to analyze and digest hundreds and thousands of log files and support materials for a given product, trying to distinguish patterns of certain issues and reuse those patterns to process new sets of log files and automatically identify a reoccurrence of the same issue.

However, such log-based systems exhibit several challenges including:

1. With the growing complexity of products, there might be millions of lines to be analyzed in a set of log files, and 2. The most relevant pattern for a certain issue may only be found in several lines of logs with a certain sequence As a result, learning by training machine learning systems using large amount of log sets solely may be as challenging as looking for a needle in a haystack, not even to mention there may be a lot of distracting or incorrect patterns reflected in log-based training data.

SUMMARY

Techniques are disclosed for issue handling using unsupervised machine learning.

In one embodiment, a system includes at least one processing device having a processor coupled to a memory. The at least one processing device is configured to implement the following steps: processing collected input text into sentence-structured data and non-sentence-structured data. For the non-sentence-structured data, determining a number 'k' of clusters for the non-sentence-structured data, and using a first machine learning (ML) algorithm to generate a non-sentence-structured issues list by categorizing the non-sentence-structured data into 'k' clusters. For the sentence-structured data, using a second machine learning (ML) model to generate a sentence-structured issues list based on semantic similarity determined among the sentence-structured data. For each issue in the non-sentence-structured issues list and in the sentence-structured issues list, identifying linked issues, using a support ticket system, among the non-sentence-structured issues list and the sentence-structured issues list, and using the linked issues to order each issue based on computing a weighted ranking score for each issue.

In some embodiments, the non-sentence-structured data includes phrases and words. The input text can be historical support tickets or new support tickets. The historical and new support tickets can include a description portion, a comment portion, a root cause analysis portion, components, and software and hardware versions. The sentence-structured data can include the description portion, natural language explanations from the comment portion, and natural language explanations from the root cause analysis portion of the historical and new support tickets. The non-sentence-structured data can include the components, the software or hardware versions, logs extracted from the comment portion, and logs extracted from the root cause analysis portion of the historical and new support tickets. The input text can be pre-processed, prior to processing the collected input text into the sentence-structured data and the non-sentence-structured data. The pre-processing can include removing timestamps from the input text, removing log identifiers from the input text, and tokenizing the input text into a corpus. The first ML algorithm can include k-means clustering. The input text can be historical and new support tickets that include a comment portion, a root cause analysis portion, components, and software and hardware versions. The k-means clustering can be trained using a feature set that includes the components, the software or hardware versions, logs extracted from the comment portion, and logs extracted from the root cause analysis portion of the historical and new support tickets. The 'k' number of clusters can be determined using an inertia and a silhouette score. The inertia can be a minimum inertia and the silhouette score can be a maximum silhouette score. The second ML model can be a BERT (bidirectional encoder representations from transformers) model. The input text can be historical and new support tickets that include a description portion, a comment portion, and a root cause analysis portion. The second ML model can be trained using a feature set that includes the description portion, natural language explanations from the comment portion, and natural language explanations from the root cause analysis portion of the historical and new support tickets. The semantic similarity can be a cosine similarity above a predetermined threshold. The weighted ranking score can be computed using: the semantic similarity for the issues in the sentence-structured issues list, an index indicating whether a given issue is contained in both the sentence-structured issues list and the non-sentence-structured issues list, a semantic similarity determined for the linked issues in the sentence-structured issues list, and a count of the linked issues in the non-sentence-structured issues list.

Other example embodiments include, without limitation, apparatus, systems, methods, and computer program products comprising processor-readable storage media.

Other aspects will be apparent from the following detailed description and the amended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

In the drawings:

FIG. 2 discloses a flowchart of an example method, in accordance with illustrative embodiments.

DETAILED DESCRIPTION

Figure 1:
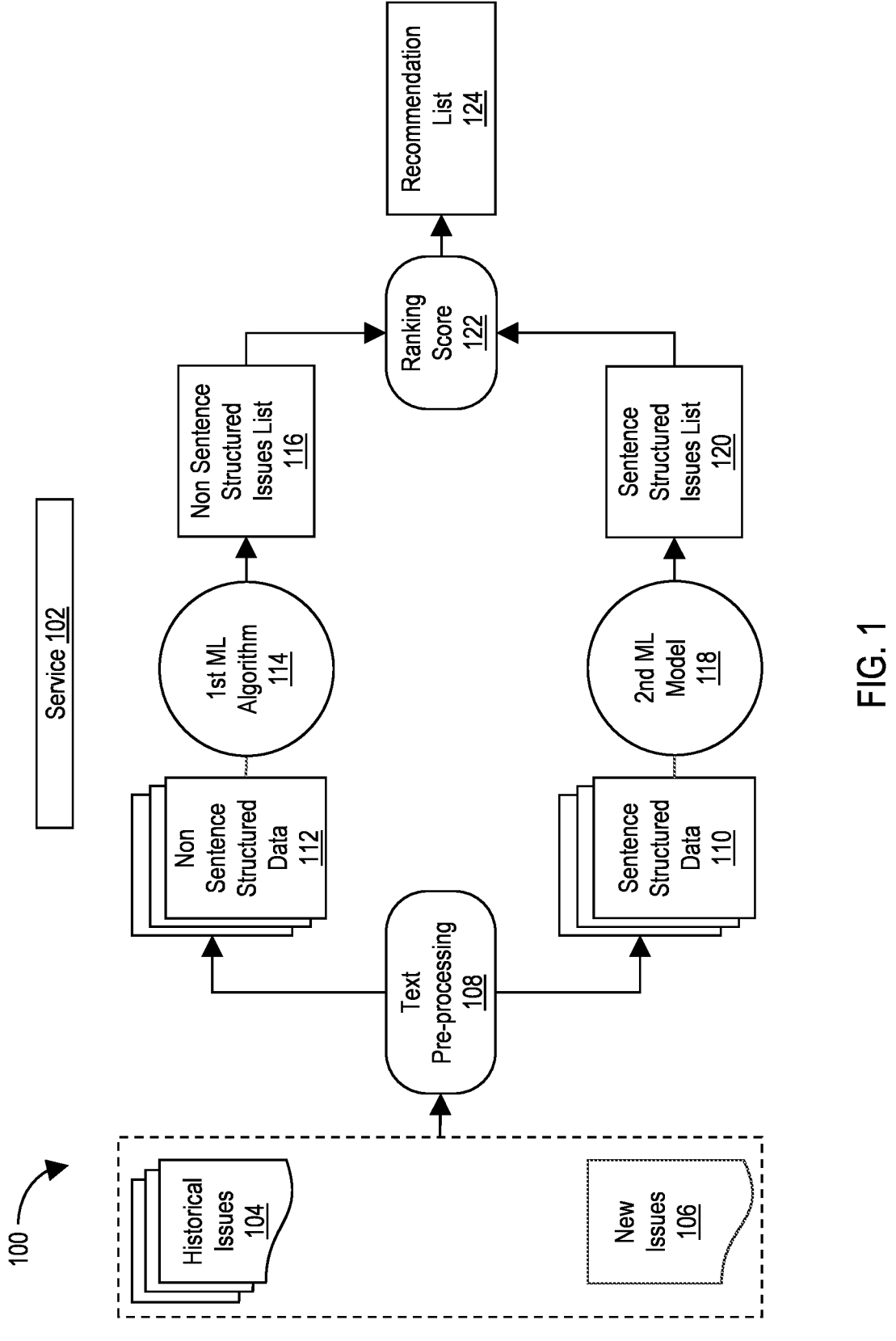
FIG. 1 discloses aspects of an example issue handling solution, in accordance with illustrative embodiments.

Example embodiments generally relate to identification and resolution of customer system problems. More specifically, at least some embodiments relate to systems, hardware, software, computer-readable media, and methods for identifying recommended solutions for a customer system problem by identifying related support tickets from customers using machine learning.

Disclosed herein are techniques for identification and resolution of customer system issues using unsupervised machine learning. In particular, example embodiments categorize different types of collected input text into sentence-structured data and non-sentence structured data, and use suitable machine learning (ML) algorithms and ML models to process the associated data accordingly. Additionally, by operating in concert with a support ticket system, the present issue handling solution is able to leverage relationships identified among issue tickets to consolidate results from the ML algorithms and models in order to generate a recommendation list of related support tickets and issue cases.

In high-technology enterprises, there are hundreds and thousands of new issue cases and support tickets open on a daily basis. Instead of pursuing an end-to-end solution by using log sets for these new issues as mentioned above, the present issue handling solution leverages a more effective source of data. With credit to hard-working engineers, detailed troubleshooting processes are well documented in existing issues in the form of comments, including a combination of both log snippets as evidence and explanation to further describe it. These existing troubleshooting steps, including log snippets and explanations in human language (e.g., natural language), can be organized and used as training data for machine learning algorithms and machine learning models since they can greatly reduce the amount of log lines to be analyzed by focusing on smaller but more relevant parts. In addition, the explanation in human language can provide cross-references from a different dimension to improve overall accuracy. The disclosed techniques introduce an improved issue handling methodology that can provide high similarity historical issues as references for a given issue.

The present issue handling techniques help to reorganize existing troubleshooting steps and identify similar cases, issues, and support tickets where the solution in those similar cases can be applied to new issues. The present ML mechanism aims to learn from the historical troubleshooting record and methodology to generate a list of candidates of historical issues that meet similarity benchmarks relative to a given new issue. Then these candidates of historical issues can be reordered by evaluating their links and relationships in the ticket system. In example embodiments, candidate issues having more links with other candidate issues receive a higher ranking score. Ultimately, the group of candidates with the highest ranking score can be provided, for example as best-fit recommendations, that an engineer can refer to and reapply solutions identified in recommended candidate issues, when handling given new issues.

The disclosed issue handling techniques provide a beneficial technical solution addressing multiple aspects. In the first place, the present issue handling solution can auto match and recommend similar issues as recommendations.

Hence, the case handling support process can be shortened significantly and can lead to improved customer experience. Further, test cycle durations could be shortened for quality assurance teams by leveraging the disclosed techniques. Furthermore, the present issue handling solution can be used for training purposes to help junior engineers familiarize themselves with historical cases. By referring to historical closed issues that exhibit high similarity, junior engineers can provide accurate and quick analysis.

In some embodiments, the present issue handling solution can be a product operable to support the vast majority of popular support ticket and issue systems. More particularly, support ticket systems generally provide application programming interfaces to access and leverage ticket data and relationships externally.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows aspects of an example issue handling solution 100, in accordance with illustrative embodiments. In particular, FIG. 1 illustrates the issue handling solution configured to process collected input text and generate a recommendation list 124 of related issues.

In example embodiments, service 102 can implement the present issue handling techniques. As used herein, the term "service" refers to an automated program that is tasked with performing different actions based on input. In some cases, the service can be a deterministic service that operates fully given a set of inputs and without a randomization factor. In other cases, the service can be or can include a ML or artificial intelligence engine. The ML engine enables the service to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) (SVM), artificial intelligence device(s), or any other type of intelligent computing system. Any amount of training data may be used (and perhaps later refined) to train the machine learning algorithm to dynamically perform the disclosed operations. As discussed in further detail herein, example training data can include collected input text such as historical issues 104.

In some implementations, the service 102 is a cloud service operating in a cloud environment. In some implementations, the service is a local service operating on a local device, such as a server. In some implementations, the service is a hybrid service that includes a cloud component operating in the cloud and a local component operating on a local device. These two components can communicate with one another.

Example embodiments of collected input text can include historical issues 104 and new issues 106. The historical issues can include historical support tickets. The new issues can include new support tickets. In example embodiments, features used for the present issue handling solution are collected from a support ticket system for both historical issues and new issues. Example features include, but are not limited to, identifier or key, components, version, a description portion, a comment portion, and a RCA (root cause analysis) portion. These features are discussed in further detail in connection with Table 1.

The version can include a version number for associated software or hardware that is identified in a support ticket. In some embodiments, only the main version part is used. In some support ticket systems, the comment and RCA portions have a relatively complex structure including a mix of non-sentence-structured (e.g., log) and sentence-structured (e.g., natural language) explanations. Accordingly, in example embodiments the comment and RCA portions are separated into non-sentence-structured data (e.g., log) and sentence-structured data (e.g., natural language explanation), respectively, as discussed in further detail herein.

In example embodiments, text pre-processing 108 occurs after the input text is collected and organized. Some embodiments of the log data use static patterns beginning with a timestamp and serial number that can be extracted, for example using regular expressions. Example text pre-processing includes, but is not limited to, removing timestamp information, removing log identifier information, and tokenizing the input text into a corpus from the input text.

In example embodiments, the sentence-structured data 110 includes natural language data that is separated from the collected and pre-processed input text. The sentence-structured data generally includes data from support tickets that has the form of natural language. Example sentence-structured data includes, but is not limited to, a description portion, natural language explanations from a comment portion, and natural language explanations from a RCA portion of the support ticket. This data can be structured, for example, in the form of natural language sentences, as shown in Table 1. As discussed in further detail herein, the present issue handling solution applies different encoding methods to the different data and corresponding structures.

In example embodiments, the non-sentence-structured data 112 includes natural language data that is separated from the collected and pre-processed text. The non-sentence-structured data generally includes data from support tickets in a format other than sentence-length natural language. Example non-sentence-structured data includes associated components, software or hardware versions, logs extracted from a comment portion, and logs extracted from an RCA portion of the support ticket. This data can be structured, for example, in the form of natural language phrases or words, as shown in Table 1. As discussed in further detail herein, the present issue handling solution applies different encoding methods to the different data and corresponding structures.

TABLE 1

| Feature Name | Structure | Machine Learning |
|---|---|---|
| Components | Phrases, words | 1st ML algorithm |
| Version | | (e.g., K-Means) |
| Log from comment | | |
| Log from RCA | | |
| Description | Natural language | 2nd ML model |
| Human language from comment | sentences | (e.g., BERT) |
| Human language from RCA | | |

In example embodiments, a first machine learning (ML) algorithm 114 is configured to process the non-sentencestructured data 112. For example, k-means clustering can be used to process the phrase and word non-sentence structures.

In some embodiments, the k-means clustering is trained using a feature set that includes the components, the software or hardware versions, logs extracted from the comment portion, and logs extracted from the root cause analysis portion of the historical and new support tickets.

Generally, a goal of K-means clustering is to group high similarity data points into the same cluster. The number of clusters is represented as 'k.' In example embodiments, the present issue handling solution is configured to determine the number 'k' of clusters for the non-sentence-structured data 112. In some embodiments, after converting the collected input text to vectors, the number 'k' of clusters can be determined using an inertia and a silhouette score. For example, a combination of minimizing inertia and maximizing the silhouette score can indicate a preferred number 'k' for clustering.

In example embodiments, after the number 'k' of clusters is determined, the present issue handling solution uses the first ML algorithm 114 to assign a cluster label to each historical issue 104 associated with the non-sentence-structured data 112.

In example embodiments, the non-sentence-structured issues list 116 includes a list of issues and corresponding cluster labels identified by the first ML algorithm 114. For example, the issue identifiers or keys that are identified to be in the same cluster by the k-means clustering are saved in the non-sentence-structured issues list along with their corresponding cluster labels. The non-sentence-structured issues list can be used along with the sentence-structured issues list 120 to determine an associated ranking score 122, as discussed in further detail herein.

In example embodiments, a second ML model 118 is configured to process the sentence-structured data 110. In some embodiments, the second ML model is a pre-trained model referred to as BERT (Bidirectional Encoder Representations from Transformers). The second ML model is configured to measure semantic similarity of input data. Additional details regarding BERT are disclosed in Devlin et al., BERT: Pre-training of Deep Bidirectional Transformers for Language Understanding, https://arxiv.org/pdf/1810.04805.pdf, the entire contents of which are incorporated herein for all purposes.

In some embodiments, the BERT model is trained using a feature set that includes the description portion, natural language explanations from the comment portion, and natural language explanations from the root cause analysis portion of the historical and new support tickets.

The second ML model is configured to convert a natural language sentence as input, into a vector representation. As a result, example embodiments are able to determine semantic similarity by computing a cosine similarity (e.g., a smallest angle) between the vectors that represent the input data. In some embodiments, the sentences can be converted into vectors using a Python package for pre-trained models such as "Sentence Transformers."

In example embodiments, the sentence-structured issues list 120 includes issues that are identified to be above a given semantic similarity. For example, based on the cosine similarity determined using the second ML model, the sentence-structured issues list can include candidate issues such as issues having a cosine similarity higher than a predetermined threshold. In some embodiments, the predetermined threshold can be half of a maximum possible cosine similarity.

In example embodiments, the ranking score 122 determines a ranking of issues among those issues that are identified in the non-sentence-structured issues list 116 and the sentence-structured issues list 120. The non-sentence-structured issues list allows the present issue handling solution to identify issues in the same cluster. The sentence-structured issues list allows the present issue handling solution to identify issues having a predetermined amount of semantic similarity. A ranking of issues that are related to a given new issue 106 is determined using a weighted ranking score as described below.

Some embodiments of the ranking score 122 leverage a support ticket system. Advantageously, a support ticket system allows the present issue handling system to leverage relationships between support tickets or issues that are tracked or identified using the support ticket system. For example, some support ticket systems are configured to track relationships such as whether a given issue "relates to" another issue, whether a given issue "duplicates" another issue, and the like. As discussed in further detail herein, the present issue handling solution is configured to leverage such relationship information provided by the support ticket system when determining the ranking score for issues.

In example embodiments, the ranking score 122 is configured to assess each support ticket or issue associated with either the non-sentence-structured issues list or the sentence-structured issues list.

Example embodiments determine the ranking score 122 according to:

$$\text{Ranking Score} = S_b + a * S_k + \sum_{i=1}^{n} w_{Bi} + w_k * m$$

'$S_b$' represents a semantic similarity for the issues in the sentence-structured issues list 120. For example, '$S_b$' can be the cosine similarity score in the sentence-structured issues list. In particular, the sentence-structured issues list can be ordered according to the cosine similarity of the input issue. Phrased differently, the higher ranking in the ordered sentence-structured issues list, the more similar that a given issue is, based on the content of the issue.

'a' represents an index indicating whether a given issue is contained in both the non-sentence-structured issues list 116 and the sentence-structured issues list 120 and. For example, 'a' can be 1 if the same issue appears in both the sentence-structured issues list and the non-sentence-structured issues list, and 0 otherwise. '$S_k$' represents a semantic similarity score for a given issue in the non-sentence-structured issues list. In other words, '$S_k$' represents a semantic similarity score for a given issue in the same cluster. In example embodiments, '$S_k$' represents a maximum available cosine similarity score identified by the second ML model, BERT. Accordingly, the term a*$S_k$ in the ranking score 122 represents an appreciation that if a given issue appears in both the sentence-structured issues list and the non-sentence-structured issues list, then that given issue should be prioritized accordingly in the ranking score and the associated recommendation list 124.

'$w_{Bi}$' represents a semantic similarity of linked issues in the sentence-structured issues list 120. For example, '$w_{Bi}$' can be the cosine similarity score of issues that the support system identifies as linked issues, which are tracked in the sentence-structured issues list. The term $$\sum_{i=1}^{n} w_{Bi}$$

in the ranking score 122 represents an appreciation that such linked issues provide insights for similar issues and extra value during troubleshooting. Hence, the present issue handling solution affords linked issues an additional priority in the ranking score.

'$w_K$' represents a weight for a linked issue in the corresponding cluster for a given issue. In some embodiments, '$w_K$' can be a static weight for a linked issue in the k-means cluster. 'm' represents a number of linked issues in the cluster.

In example embodiments, the recommendation list 124 is determined based on the ranking score 122. For example, the recommendation list can include a predetermined number of top cases, where the recommendation rank is based on the ranking score. The present issue handling solution can provide the top cases as the recommended reference issues or support tickets. In some embodiments, the predetermined number of top cases can be adjusted to accommodate different requirements for different products.

FIG. 2 shows a flowchart of an example method 200, in accordance with illustrative embodiments. In example embodiments, the method 200 allows for improved issue handling by identifying similar historical issues as references for a given issue.

In some embodiments, the method 200 can be performed by the issue handling solution 100, such as using the service 102.

In example embodiments, the method 200 includes processing collected input text into sentence-structured data and non-sentence-structured data (step 202). In some embodiments, the non-sentence-structured data includes phrases and words. In some embodiments, the input text is historical support tickets or new support tickets. In further embodiments, the historical and new support tickets include a description portion, a comment portion, a root cause analysis portion, components, and software and hardware versions. The sentence-structured data includes the description portion, natural language explanations from the comment portion, and natural language explanations from the root cause analysis portion of the historical and new support tickets. The non-sentence-structured data includes the components, the software or hardware versions, logs extracted from the comment portion, and logs extracted from the root cause analysis portion of the historical and new support tickets. In some embodiments, the input text is pre-processed, prior to processing the collected input text into the sentence-structured data and the non-sentence-structured data. In further embodiments, the pre-processing includes removing timestamps from the input text, removing log identifiers from the input text, and tokenizing the input text into a corpus.

In example embodiments, the method 200 includes, for the non-sentence-structured data, determining a number 'k' of clusters for the non-sentence-structured data and using a first ML algorithm to generate a non-sentence-structured issues list by categorizing the non-sentence-structured data into 'k' clusters (step 204). In some embodiments, the first ML algorithm is k-means clustering. In further embodiments, the input text is historical and new support tickets that include a comment portion, a root cause analysis portion, components, and software and hardware versions. The k-means clustering can be trained using a feature set that includes the components, the software or hardware versions, logs extracted from the comment portion, and logs extracted from the root cause analysis portion of the historical and new support tickets. In some embodiments, the 'k' number of clusters is determined using an inertia and a silhouette score. In further embodiments, the inertia is a minimum inertia and the silhouette score is a maximum silhouette score.

In example embodiments, the method 200 includes, for the sentence-structured data, using a second ML model to generate a sentence-structured issues list based on semantic similarity determined among the sentence-structured data (step 206). In some embodiments, the second ML model is a BERT model. In some embodiments, the input text is historical and new support tickets that include a description portion, a comment portion, and a root cause analysis portion. The second ML model is trained using a feature set that includes the description portion, natural language explanations from the comment portion, and natural language explanations from the root cause analysis portion of the historical and new support tickets. In some embodiments, the semantic similarity is a cosine similarity above a predetermined threshold.

In example embodiments, the method 200 includes, for each issue in the non-sentence-structured issues list and in the sentence-structured issues list, identifying linked issues, using a support ticket system, among the non-sentence-structured issues list and the sentence-structured issues list (step 208). In some embodiments, the linked issues are identified based on a relationship between issues that is identified by the support ticket system. In further embodiments, the relationship is a "relates to" or a "duplicates" relationship.

In example embodiments, the method 200 includes using the linked issues to order each issue based on computing a weighted ranking score for each issue (step 210). In some embodiments, the weighted ranking score is computed using: the semantic similarity for the issues in the sentence-structured issues list, an index indicating whether a given issue is contained in both the sentence-structured issues list and the non-sentence-structured issues list, a semantic similarity determined for the linked issues in the sentence-structured issues list, and a count of the linked issues in the non-sentence-structured issues list.

While the various steps in the example method 200 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 200 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Working Example

In connection with the present issue handling solution, 300 support ticket cases were extracted from an existing support ticket system. The extracted issues were selected to have a given project designation and corresponding product designation. The extracted issues were used as historical issues 104. Features were determined from the historical issues, including an identifier or key, components, a version portion, a description portion, a comment portion, and a RCA portion.

After text pre-processing and separating the collected input text into non-sentence-structured data 112 (e.g., log data) and sentence-structured data 110 (e.g., natural language sentence data), k-means clustering was applied to the components, version, extracted log data from the comment portions, and extracted log data from the RCA portions. A number 'k' of clusters was determined by minimizing the inertia and maximizing the silhouette score. For the historical issues referenced in this example, it was determined that k=13 exhibited the lowest inertia and highest silhouette score. Accordingly a first ML algorithm, k-means clustering, was used to categorize each historical issue according to the 13 cluster labels. The corresponding issue identifiers or keys of all issues in the same group were identified in a non-sentence-structured issues list 116 for use in determining a ranking score. For example, for a given new case 106, MDT-430892, that is open, there were 49 issues categorized to be in the same cluster as MDT-430892. Therefore, the corresponding issue identifiers in this cluster were saved in the non-sentence-structured issues list for computing the ranking score 122.

The historical issues 104 were also used to train the second ML model. Features used in the second ML model, BERT, were extracted from natural language sentences found in the comment portions, description portions, and RCA portions of the example support cases. To improve the accuracy of the ML results, BERT was run separately on each of the features. Then, the cosine similarity was summed in each iteration which ranges from 0 to 3.

BERT was also used to generate the sentence-structured issues list 120 including all cases above the predetermined threshold, e.g., a cosine similarity higher than half of the maximum possible value. Since the maximum value was 3 in this example, the threshold was 1.5. 10 cases from the sentence-structured issues list were selected for illustrative purposes, and these highest candidates were included in the sentence-structured issues list for computing the ranking score 122.

Table 2 shows the detailed calculation for the ranking score 122, for the 10 example issues identified the sentence-structured issues list 120. The column '$S_b$' contains the semantic similarity identified using the second ML model between the open case MDT-430892 and the historical cases, e.g., the cosine similarity identified using BERT. The column 'a' and the underlined cells in Table 2 indicate that the underlined issue appeared in both the sentence-structured issues list and the non-sentence-structured issues list 116. Therefore, the corresponding binary indices 'a' all equal 1 for those underlined issues. As discussed, in example embodiments $S_k$ is the maximum possible cosine similarity score in BERT. In the example discussed herein, the column '$S_k$' indicates that maximum cosine similarity score is 3. Bolded issues reflect linked issues as identified in the example support ticket system. The number of linked issues can be obtained by checking in the example support ticket system. For example, issue MDT-430798 has one linked issue in Table 2, which is MDT-427888. Hence, $$\sum_{i=1}^{n} w_{Bi}$$

of MDT-430798 is the cosine similarity value of MDT-427888, as shown in the '$w_{Bi}$' column. Since linked issues MDT-430798 and MDT-427888 are both included in the non-sentence-structured issues list, the $w_k$*m portion is calculated, as reflected in the '$w_K$' and 'm' columns. For illustrative purposes in this example, the value of $w_k$ is set to 1. In the non-sentence-structured issues list, MDT-430798 has only one linked issue. Therefore, the value of 'm' is 1, as shown in the 'm' column. The "Recommendation List" column reflects the recommendation list 124 as ordered according to the ranking score shown in the Ranking Score column and calculated as discussed herein.

comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers

TABLE 2

| | | | | | | | Ranking | Recommendation | |
| | | | | | | | Score | List | |
| Issue ID | $S_b$ | a | $S_k$ | $w_{Bi}$ | $w_k$ | m | | | |
| --- | --- | --- | --- | --- | --- | --- | --- | --- | --- |
| MDT-430798 | 2.70 | 1 | 3 | 2.41 | 1 | 1 | 9.11 | 1 | (tie) |
| MDT-425839 | 2.49 | 0̄ | 3 | 0 | 0 | 0 | 2.49 | 8 | |
| MDT-427888 | 2.41 | 1 | 3 | 2.70 | 1 | 1 | 9.11 | 1 | (tie) |
| MDT-427245 | 2.41 | 1̄ | 3 | 0 | 0 | 0 | 5.41 | 3 | |
| MDT-429497 | 2.37 | 1̄ | 3 | 0 | 0 | 0 | 5.37 | 4 | |
| MDT-425806 | 2.34 | 0̄ | 3 | 0 | 0 | 0 | 2.34 | 9 | |
| MDT-414750 | 2.34 | 1 | 3 | 0 | 0 | 0 | 5.34 | 5 | |
| MDT-413725 | 2.32 | 1̄ | 3 | 0 | 0 | 0 | 5.32 | 6 | |
| MDT-414869 | 2.30 | 1̄ | 3 | 0 | 0 | 0 | 5.30 | 7 | |
| MDT-420222 | 2.30 | 0̄ | 3 | 0 | 0 | 0 | 2.30 | 10 | |

OPEN CASE = MDT-430892

Overall, the recommendation list 124 reflects that the top 5 reference issues related to the open case MDT-430892 are MDT-430798 (tied), MDT-427888 (tied), MDT-427245, MDT-429497, and MDT-414750. In some embodiments, in the ranking score the weights can be adjusted to reflect whether a given feature should be more or less significant.

At least portions of the present issue handling system can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the present issue handling system. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 3. Although described in the context of the present issue handling system, these platforms may also be used to implement at least portions of other information processing systems in other embodiments.

Figure 3:
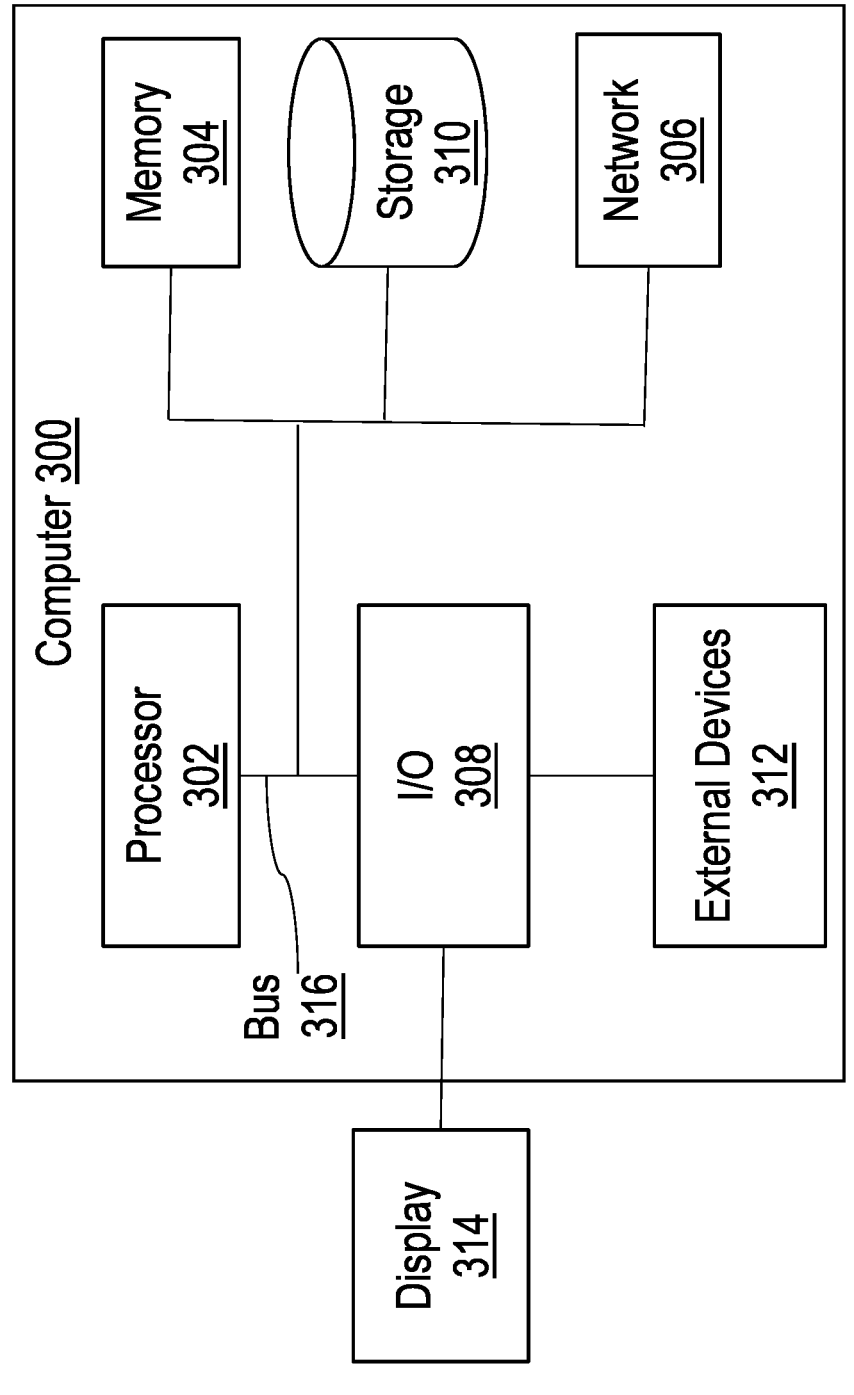
FIG. 3 discloses aspects of a computing entity configured and operable to perform any of the disclosed methods, process, and operations, in accordance with illustrative embodiments.

FIG. 3 illustrates aspects of a computing device or a computing system in accordance with example embodiments. The computer 300 is shown in the form of a general-purpose computing device. Components of the computer may include, but are not limited to, one or more processors or processing units 302, a memory 304, a network interface 306, and a bus 316 that communicatively couples various system components including the system memory and the network interface to the processor.

The bus 316 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 300 typically includes a variety of computer-readable media. Such media may be any available media that is accessible by the computer system, and such media includes both volatile and non-volatile media, removable and non-removable media.

The memory 304 may include computer system readable media in the form of volatile memory, such as random-access memory (RAM) and/or cache memory. The computer system may further include other removable/non-removable, volatile/non-volatile computer system storage media. By way of example only, the storage system 310 may be provided for reading from and writing to a non-removable, non-volatile magnetic media (not shown and typically called a "hard drive") in accordance with the present issue handling techniques. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 316 by one or more data media interfaces. As has been depicted and described above in connection with FIGS. 1 and 2, the memory may include at least one computer program product having a set (e.g., at least one) of program modules that are configured to carry out the functions of the embodiments as described herein.

The computer 300 may also include a program/utility, having a set (at least one) of program modules, which may be stored in the memory 304 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 300 may also communicate with one or more external devices 312 such as a keyboard, a pointing device, a display 314, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 308. Still yet, the computer system may communicate with one or more networks such as a local area network (LAN), a general wide area network (WAN), and/or a public network (e.g., the Internet) via the network adapter 306. As depicted, the network adapter communicates with the other components of the computer system via the bus 316. It should be understood that although not shown, other hardware and/or software components could be used in conjunction with the computer system. Non-limiting examples include microcode, device drivers, redundant processing units, external disk drive arrays, RAID systems, tape drives, data archival storage systems, and the like.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

In the foregoing description of FIGS. 1-3, any component described with regard to a figure, in various embodiments of the invention, may be equivalent to one or more like-named components described with regard to any other figure. For brevity, descriptions of these components has not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n." This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the embodiments described herein should be limited only by the appended claims.

What is claimed is:

1. A system comprising:

at least one processing device including a processor coupled to a memory;

the at least one processing device being configured to implement the following steps:

processing collected input text into sentence-structured data and non-sentence-structured data;

for the non-sentence-structured data, determining a number 'k' of clusters for the non-sentence-structured data, and using a first machine learning (ML) algorithm to generate a non-sentence-structured issues list by categorizing the non-sentence-structured data into 'k' clusters;

for the sentence-structured data, using a second machine learning (ML) model to generate a sentence-structured issues list based on semantic similarity determined among the sentence-structured data;

for each issue in the non-sentence-structured issues list and in the sentence-structured issues list, identifying linked issues, using a support ticket system, among the non-sentence-structured issues list and the sentence-structured issues list, using the linked issues to order each issue based on computing a weighted ranking score for each issue, wherein the weighted ranking score is computed using:

the semantic similarity for the issues in the sentence-structured issues list, an index indicating whether a given issue is contained in both the sentence-structured issues list and the non-sentence-structured issues list, a semantic similarity determined for the linked issues in the sentence-structured issues list, and a count of the linked issues in the non-sentence-structured issues list;

using the ordered non-sentence-structured issues list and the ordered sentence-structured issues list to generate a recommendation list including a predetermined number of top cases based on the weighted ranking score; and outputting the recommendation list to allow for referring to and reapplying solutions identified based on the recommendation list to solve subsequent similar new candidate issues.

2. The system of claim 1, wherein the non-sentence-structured data includes phrases and words.

3. The system of claim 1, wherein the collected input text is historical support tickets or new support tickets.

4. The system of claim 3, the historical and new support tickets including a description portion, a comment portion, a root cause analysis portion, components, and software and hardware versions;

the sentence-structured data including the description portion, natural language explanations from the comment portion, and natural language explanations from the root cause analysis portion of the historical and new support tickets; and the non-sentence-structured data including the components, the software or hardware versions, logs extracted from the comment portion, and logs extracted from the root cause analysis portion of the historical and new support tickets.

5. The system of claim 1, wherein the input text is pre-processed, prior to processing the collected input text into the sentence-structured data and the non-sentence-structured data, the pre-processing including:

removing timestamps from the input text;

removing log identifiers from the input text; and tokenizing the input text into a corpus.

6. The system of claim 1, wherein the first ML algorithm includes k-means clustering.

7. The system of claim 6, wherein the input text is historical and new support tickets that include a comment portion, a root cause analysis portion, components, and software and hardware versions; and wherein the k-means clustering is trained using a feature set that includes the components, the software or hardware versions, logs extracted from the comment portion, and logs extracted from the root cause analysis portion of the historical and new support tickets.

8. The system of claim 1, wherein the 'k' number of clusters is determined using an inertia and a silhouette score.

9. The system of claim 8, wherein the inertia is a minimum inertia and the silhouette score is a maximum silhouette score.

10. The system of claim 1, wherein the second ML model is a BERT (bidirectional encoder representations from transformers) model.

11. The system of claim 1, wherein the input text is historical and new support tickets that include a description portion, a comment portion, and a root cause analysis portion; and wherein the second ML model is trained using a feature set that includes the description portion, natural language explanations from the comment portion, and natural language explanations from the root cause analysis portion of the historical and new support tickets.

12. The system of claim 1, wherein the semantic similarity is a cosine similarity above a predetermined threshold.

13. A method comprising:

processing collected input text into sentence-structured data and non-sentence-structured data;

for the non-sentence-structured data, determining a number 'k' of clusters for the non-sentence-structured data, and using a first machine learning (ML) algorithm to generate a non-sentence-structured issues list by categorizing the non-sentence-structured data into 'k' clusters;

for the sentence-structured data, using a second machine learning (ML) model to generate a sentence-structured issues list based on semantic similarity determined among the sentence-structured data;

for each issue in the non-sentence-structured issues list and in the sentence-structured issues list, identifying linked issues, using a support ticket system, among the non-sentence-structured issues list and the sentence-structured issues list, and using the linked issues to order each issue based on computing a weighted ranking score for each issue, wherein the weighted ranking score is computed using:

the semantic similarity for the issues in the sentence-structured issues list, an index indicating whether a given issue is contained in both the sentence-structured issues list and the non-sentence-structured issues list, a semantic similarity determined for the linked issues in the sentence-structured issues list, and a count of the linked issues in the non-sentence-structured issues list;

using the ordered non-sentence-structured issues list and the ordered sentence-structured issues list to generate a recommendation list including a predetermined number of top cases based on the weighted ranking score; and outputting the recommendation list to allow for referring to and reapplying solutions identified based on the recommendation list to solve subsequent similar new candidate issues.

14. The method of claim 13, wherein the first ML algorithm includes k-means clustering; and wherein the second ML model is a BERT (bidirectional encoder representations from transformers) model.

15. The method of claim 13, wherein the 'k' number of clusters is determined using a minimum inertia and a maximum silhouette score.

16. The method of claim 13, wherein the collected input text is historical and new support tickets that include a description portion, a comment portion, a root cause analysis portion, components, and software and hardware versions;

wherein the k-means clustering is trained using a feature set that includes the components, the software or hardware versions, logs extracted from the comment portion, and logs extracted from the root cause analysis portion of the historical and new support tickets; and wherein the second ML model is trained using a feature set that includes the description portion, natural language explanations from the comment portion, and natural language explanations from the root cause analysis portion of the historical and new support tickets.

17. The method of claim 13, wherein the input text is pre-processed, prior to processing the collected input text into the sentence-structured data and the non-sentence-structured data, the pre-processing including:

removing timestamps from the input text;

removing log identifiers from the input text; and tokenizing the input text into a corpus.

18. A non-transitory processor-readable storage medium having stored thereon program code of one or more software programs, wherein the program code when executed by at least one processing device causes the at least one processing device to perform the following steps:

processing collected input text into sentence-structured data and non-sentence-structured data;

for the non-sentence-structured data, determining a number 'k' of clusters for the non-sentence-structured data, and using a first machine learning (ML) algorithm to generate a non-sentence-structured issues list by categorizing the non-sentence-structured data into 'k' clusters;

for the sentence-structured data, using a second machine learning (ML) model to generate a sentence-structured issues list based on semantic similarity determined among the sentence-structured data;

for each issue in the non-sentence-structured issues list and in the sentence-structured issues list, identifying linked issues, using a support ticket system, among the non-sentence-structured issues list and the sentence-structured issues list, and using the linked issues to order each issue based on computing a weighted ranking score for each issue, wherein the weighted ranking score is computed using:

the semantic similarity for the issues in the sentence-structured issues list, an index indicating whether a given issue is contained in both the sentence-structured issues list and the non-sentence-structured issues list, a semantic similarity determined for the linked issues in the sentence-structured issues list, and a count of the linked issues in the non-sentence-structured issues list;

using the ordered non-sentence-structured issues list and the ordered sentence-structured issues list to generate a recommendation list including a predetermined number of top cases based on the weighted ranking score; and outputting the recommendation list to allow for referring to and reapplying solutions identified based on the recommendation list to solve subsequent similar new candidate issues.

\* \* \* \* \*